(12) United States Patent
Lefaure

(10) Patent No.: US 6,871,157 B2
(45) Date of Patent: Mar. 22, 2005

(54) METHOD FOR AUTOMATICALLY LOCATING A MOTOR VEHICLE WHEEL AND CORRESPONDING LOCATING UNIT

(75) Inventor: Philippe Lefaure, Montbrun Lauragais (FR)

(73) Assignee: Siemens VDO Automotive, Toulouse Cedex (FR)

(*) Notice: Subject to any disclaimer, the term of this patent is extended or adjusted under 35 U.S.C. 154(b) by 0 days.

(21) Appl. No.: 10/432,729

(22) PCT Filed: Dec. 4, 2001

(86) PCT No.: PCT/EP01/14174

§ 371 (c)(1),
(2), (4) Date: May 27, 2003

(87) PCT Pub. No.: WO02/051654

PCT Pub. Date: Jul. 4, 2002

(65) Prior Publication Data

US 2004/0055372 A1 Mar. 25, 2004

(30) Foreign Application Priority Data

Dec. 22, 2000 (FR) .......................................... 00 16898

(51) Int. Cl.[7] .................... G06F 15/00; B60C 23/00; G01L 17/00
(52) U.S. Cl. .................... 702/150; 702/138; 702/148
(58) Field of Search ............................... 702/138, 142, 702/148, 150; 73/146.4, 146.5; 340/442, 444, 447

(56) References Cited

U.S. PATENT DOCUMENTS

| 5,880,363 A | 3/1999 | Meyer et al. |
| 6,446,023 B1 * | 9/2002 | Ernst ........................ 702/138 |
| 6,476,712 B1 * | 11/2002 | Achterholt ................ 340/447 |

* cited by examiner

Primary Examiner—Bryan Bui
(74) Attorney, Agent, or Firm—Young & Thompson

(57) ABSTRACT

A method for automatically locating a motor vehicle wheel comprises the following steps: transmission by the wheel unit (12a to 12d) of high-frequency signals representing, at least, the wheel pressure whereon the wheel unit is mounted, and a code identifying the wheel; reception by the central unit (11) of the high-frequency signals transmitted by the wheel unit. The method further comprises the following steps: transmission of low-frequency signals by at least a transmission device (14, 14') mounted on the vehicle proximate to the wheels along a predetermined position, so as to activate the units arranged proximate; reception of the low-frequency signals by the wheel units and in response, transmission of high-frequency signals by the activated wheels, the signal comprising at least the code identifying the activated wheels, and reception of the high-frequency signal by the central unit (11) associated with the code identifying the activated wheels, at the position of the transmission device(s) 14, 14'.

4 Claims, 1 Drawing Sheet

METHOD FOR AUTOMATICALLY LOCATING A MOTOR VEHICLE WHEEL AND CORRESPONDING LOCATING UNIT

CROSS REFERENCE TO RELATED APPLICATIONS

This application is the 35 USC 371 national stage of international application PCT/EP01/14174 filed on 4 Dec. 2001, which designated the United States of America.

The present invention relates to a process for automatically locating the wheels of a motor vehicle and a corresponding locating unit.

BACKGROUND OF THE INVENTION

It is already known to measure and to monitor the pressure inside the tires of each of the wheels of a vehicle. The pressure thus measured (and/or other parameters) is conveyed by a high-frequency signal to a central computation unit situated in the vehicle. This central unit has the function of processing the signals received and of informing the driver as to any abnormal pressure of the tires (or abnormal rise in temperature, etc). In general this central computation unit is disposed in the passenger compartment of the vehicle and manages all the functions implemented in this passenger compartment. In order for this central computation unit to correctly process the signals received, it is imperative that it can unambiguously determine the origin thereof.

For this purpose, processes (so-called locating processes) exist which make it possible to determine where the wheel transmitting a signal is situated, but these processes are either lengthy, or onerous, or complex and often require considerable computation times before managing to assign a precise transmission site on the vehicle (for example, front right, front left, rear right or rear left) to each signal received.

SUMMARY OF THE INVENTION

The aim of the present invention is to rapidly locate the wheels of a motor vehicle. The process according to the invention must furthermore be automatic, reliable and cheap. Preferably, one seeks to reduce the cost of this locating function by using the fewest possible specific components.

For this purpose the present invention relates to a process for automatically locating the wheels of a motor vehicle, said vehicle comprising a wheel unit integral with each of the wheels of the vehicle and a central computation unit disposed in the vehicle, said process comprising the following steps:

transmission by the wheel unit of high-frequency signals representative, at least, of the pressure of the wheel on which the wheel unit is mounted, as well as of a code identifying this wheel, reception by the central unit of the high-frequency signals transmitted by the wheel unit, said process being characterized in that it furthermore comprises the following steps:

transmission of a low-frequency signal by at least one transmission device mounted on the vehicle in proximity to the wheels according to a predetermined position, in such a way as to wake up the wheel units placed in proximity, reception of this low-frequency signal by the wheel units and, in response, transmission of a high-frequency signal by the woken-up wheels, said signal comprising at least the code identifying the woken-up wheels, and reception of the high-frequency signal by the central unit and association of the code identifying the woken-up wheel units, with the position of the transmission device.

Thus, by placing the low-frequency transmission device in proximity to the wheels of one and the same axle (for example), it is certain that only the wheels of this axle will respond to the low-frequency signal transmitted by the transmitter. This is because a low-frequency signal can be picked up only within a limited radius of action (for example 1 m).

Advantageously the transmission of the low-frequency signal is performed by antennas disposed in the handles, side trims, rear-view mirrors, etc and used in addition by a device for remote control of access on board the vehicle.

Thus it is the antennas which already serve for the locking/unlocking of the vehicle which are re-used here to wake up the electronic wheel units. By using antennas which already exist on most vehicles, the cost of the process according to the invention is reduced.

Of course when the vehicle is not already equipped with such antennas, it suffices to place three low-frequency transmission devices in front of three wheels of the vehicle so as to automatically pinpoint these three wheels. The last wheel position is deduced from the three positions found.

More advantageously, when the transmitting antennas (transmission device) placed in the handles are used (these antennas already serving for the control of locking/unlocking of the openable panels), the low-frequency signal sent to the wheel units is an uncoded signal, while when these antennas are used in their vehicle locking/unlocking function, they use a coded low-frequency signal. Thus, to locate the wheels, it is sufficient to remove the coding. Here again a substantial saving is made.

The present invention also relates to a unit for locating the wheels of a motor vehicle implementing the process described hereinabove.

BRIEF DESCRIPTION OF THE DRAWINGS

Other objects, characteristics and advantages of the present invention will emerge moreover from the following description, by way of nonlimiting example and with reference to the appended drawings in which.

DETAILED DESCRIPTION OF THE INVENTION

Figure 1:
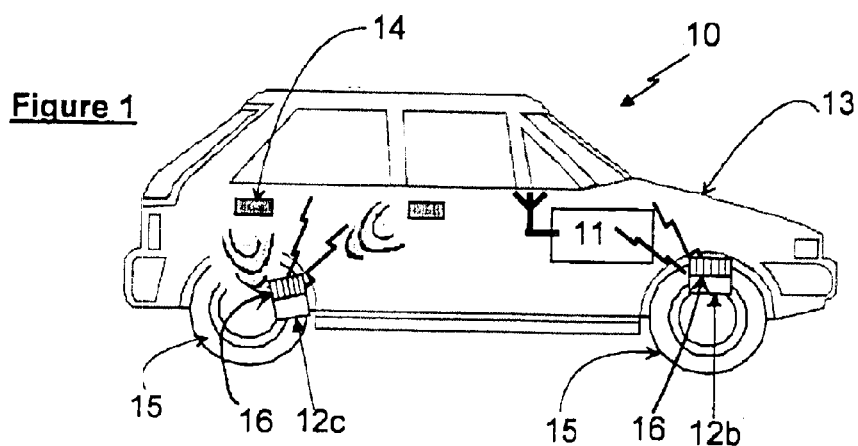
FIG. 1 is a diagrammatic view of a motor vehicle fitted with a locating unit according to the invention.
Figure 3:
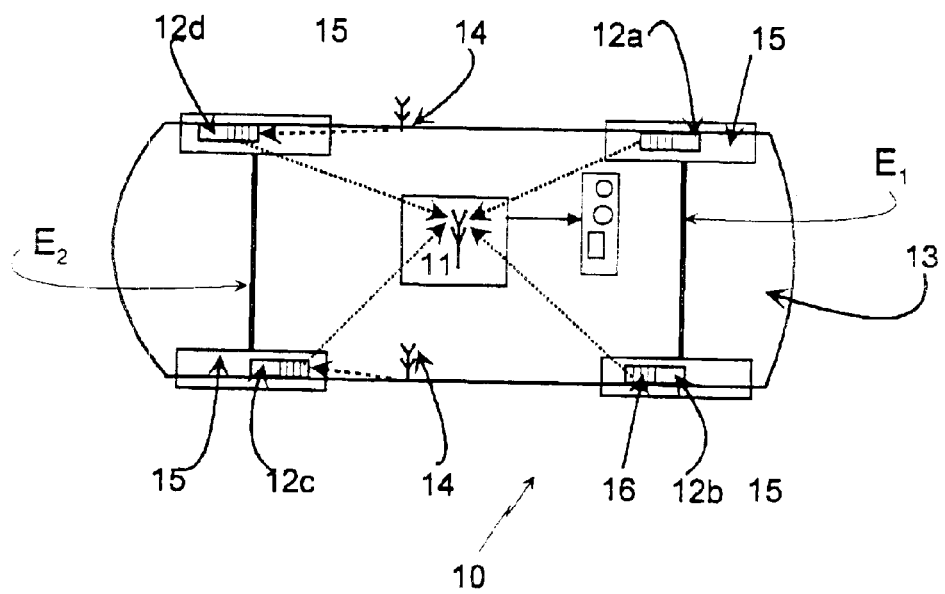
FIG. 3 is a diagrammatic view showing the locating unit according to FIG. 1.

According to the embodiment shown in FIGS. 1 and 3, the locating unit 10 according to the invention comprises:

a central computation unit 11, placed in a vehicle 13, a plurality of wheel units 12a to 12d each integral with one of the wheels 15 of the vehicle, and a transmission device 14 integral with the vehicle and placed according to a known position on this vehicle. For example, in proximity to the wheels of one and the same axle ($E_2$ in FIG. 3).

The central computation unit 11 is an electronic computer managing for example all the functions required in the passenger compartment of a vehicle. In a known manner, such a computer is customarily placed under the dashboard (but this is not limiting). This computer is fitted with a receiving antenna suitable for receiving high-frequency signals typically in the 315 MHz or 433 MHz region. Such signals exhibit the particular feature of having a very large range (for example 10 m) but do not transport energy. These signals are commonly used for the opening/closing of the openable panels at large distance, the telephone or the alarm.

The wheel units 12a to 12d are all similar and comprise a pressure sensor of known type (not detailed here) and an RF (radio frequency) device 16 for transmitting the measured data. The latter are transmitted to the central unit 11 regularly and/or when a specified event so necessitates. Other parameters may also be transmitted to the central unit, for example the temperature of the tire, its acceleration etc. Together with this set of parameters the wheel unit also transmits an identifying code specific to it. This set of data is transmitted to the central unit 11 by a high-frequency signal.

According to the invention, to determine the identifying code of each wheel, a transmission device 14 placed on the vehicle is used. In the example illustrated, this device is placed in proximity to a specified axle.

In the example represented in FIGS. 1 and 3 this transmission device is made up of antennas 14, of known type, placed in the rear doors of the vehicle so as to allow their remote locking/unlocking. On instruction from the central unit 11, these antennas transmit a low-frequency signal (typically of the order of 125 kHz). Such a signal exhibits the particular feature of having a low range (1 m), and can transport energy. It can therefore allow the waking-up of a transponder situated in the wheel unit.

When these antennas are used to locate a wheel, they transmit an uncoded sinusoidal low-frequency signal.

Thus even if this signal is picked up by the remote locking/unlocking device, it is not understood and causes no untimely opening of the vehicle. On the other hand this uncoded signal is received by the transponder of the wheel units situated in the zone of action of this antenna (in the present case, the rear wheels). Advantageously, by using the antennas of the rear doors of the vehicle only the wheel units situated on the rear axle $E_2$ of the vehicle can pick up this signal. The wheel units placed on the wheels of the front axle $E_1$ are too far away (range limited to 1 m) and do not receive this low-frequency signal.

It will be noted, as a variant, that even if the antennas 14 of the front wheels of the vehicle transmit a low-frequency signal at the same time as the rear antennas, only the rear wheels will receive this signal. This is because the customary configuration of a vehicle is such that in general the antennas of the handles of the front wheels are closer to the rear wheels than to the front wheels.

When the wheel units of the rear axle receive this low-frequency signal, they wake up (transponder) and send their data and their identifying code to the central unit. Hence, the central unit 11 receives two identifying codes. Since it is the central unit 11 which prompted the transmission of the low-frequency signals by the antennas of the rear doors, it immediately associates these identifying codes with the rear wheels of the vehicle. By deduction the central unit attributes the other identifying codes that it receives to the front wheels of the vehicle.

For safety reasons one waits for the central unit to have attributed the same identifying codes to the same wheels several times in succession in order to regard the identification as reliable and definitive. During the remainder of the journey of the vehicle, the identification of the position of the wheels is then no longer performed.

It will be noted that according to the invention the association of a wheel unit identifying code with a position on the vehicle is carried out with the aid of antennas already installed on the vehicle (for some other purpose entirely). The benefit of the present invention resides essentially in the fact that this association (identifying code/position) is performed without adding any extra element to the vehicle. Moreover this association is fast, reliable and inexpensive.

Figure 2:
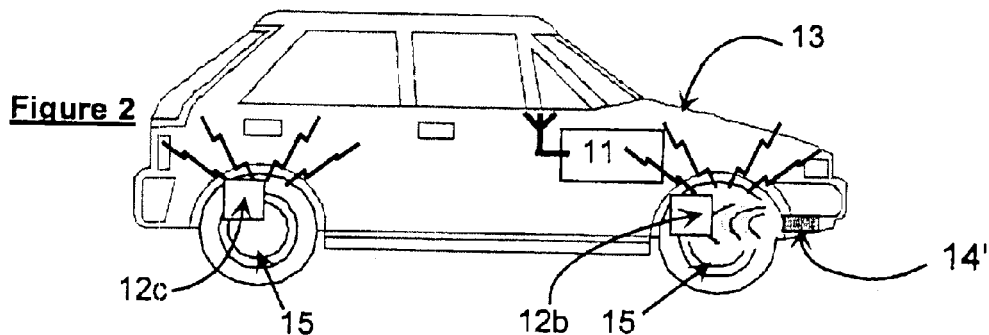
FIG. 2 is a view similar to FIG. 1 showing a variant embodiment of the locating unit according to the invention.

As a variant (FIG. 2) it is possible, when the vehicle is not already equipped with antennas in its doors to mount specific antennas 14' in proximity to the wheels of one and the same axle (front axle $E_1$, for example, in the example represented in FIG. 2). In this case the wheels which send their identifying code following the activation of the antennas 14' are the front wheels. The central unit attributes the other two identifying codes to the rear wheels.

Of course by using a process (not described here) for locating the right and left wheels, it is then possible to completely individualize the set of wheels of a vehicle and the corresponding identifying codes.

As a variant (not represented) it is possible by using three transmission devices (specific or otherwise) to prompt the response of each of the wheel units separately. The central unit activating each of the wheel antennas one by one receives the responses from the wheel units one by one. Hence, the central unit is able to associate an identifying code with a single position of a wheel of the vehicle. The fourth position is deduced. When this process has been implemented several times and the results are stable, the central unit regards the identification of the codes to have been acquired.

The locating process according to the invention comprises the following steps:

transmission by the wheel unit 12a to 12d of high-frequency signals representative, at least, of the pressure of the wheel 15 on which the wheel unit is mounted, as well as of a code identifying this wheel, reception by the central unit 11 of the high-frequency signals transmitted by the wheel unit 12a to 12d, said process being characterized in that it furthermore comprises the following steps:

transmission of a low-frequency signal by at least one transmission device 14, 14' mounted on the vehicle according to a predetermined position, in such a way as to wake up the wheel units 12 placed in proximity, reception of this low-frequency signal by the wheel units 12a to 12d and, in response, transmission of a high-frequency signal by the woken-up wheels, said signal comprising at least the code identifying the woken-up wheels, and reception of the high-frequency signal by the central unit 11 and association of the code identifying the woken-up wheel units, with the position of the transmission device or devices.

Of course, the present invention is not limited to the embodiments described hereinabove. Thus, it is possible to determine the position of the wheels situated on one of the sides of the vehicle by placing the antennas 14, 14' on that side alone.

What is claimed is:

1. A process for automatically locating the wheels of a motor vehicle, said vehicle comprising a wheel unit integral with each of the wheels of the vehicle and a central computation unit disposed in the vehicle; said process comprising the following steps:

transmitting by the wheel unit high-frequency signals representative, at least, of the pressure of the wheel on which the wheel unit is mounted, and a code identifying the wheel;

receiving by the central computation unit the high-frequency signals transmitted by the wheel unit;

transmitting an uncoded low-frequency signal by at least one transmission device comprising antennas disposed in the doors of the vehicle and used in addition, by a device for remotely locking/unlocking said doors; said transmission device being mounted on the vehicle in proximity to the wheels according to a predetermined position, in such a way as to wake up the wheel units placed in proximity;

receiving said uncoded low-frequency signal by the wheel units, and in response thereto, transmitting a high-frequency signal by the woken-up wheels; said high-frequency signal comprising at least the code identifying the woken-up wheels; and receiving the high-frequency signal by the central unit, and associating the code identifying the woken-up wheel units, with the position of the transmission device or devices.

2. The process as claimed in claim 1, wherein said transmission device also comprises specific antennas disposed in proximity to the wheels of the vehicle.

3. The process as claimed in claim 1, wherein said transmission device comprises specific antennas disposed in proximity to the wheels of the same axle.

4. A locating unit for implementing the process as claimed in claim 1, said locating unit comprising:

a central computation unit placed in the vehicle;

a wheel unit integral with each of the wheels and at least one transmission device;

said transmission device being structured and arranged to transmit a low-frequency signal;

said transmission device comprising an antenna placed in each door of the motor vehicle;

said antennas also being adapted to communicate with a device for remotely locking/unlocking the doors of the vehicle.

* * * * *